Feb. 8, 1938.   J. ROSE   2,107,766
MONOCYCLE
Filed April 6, 1937
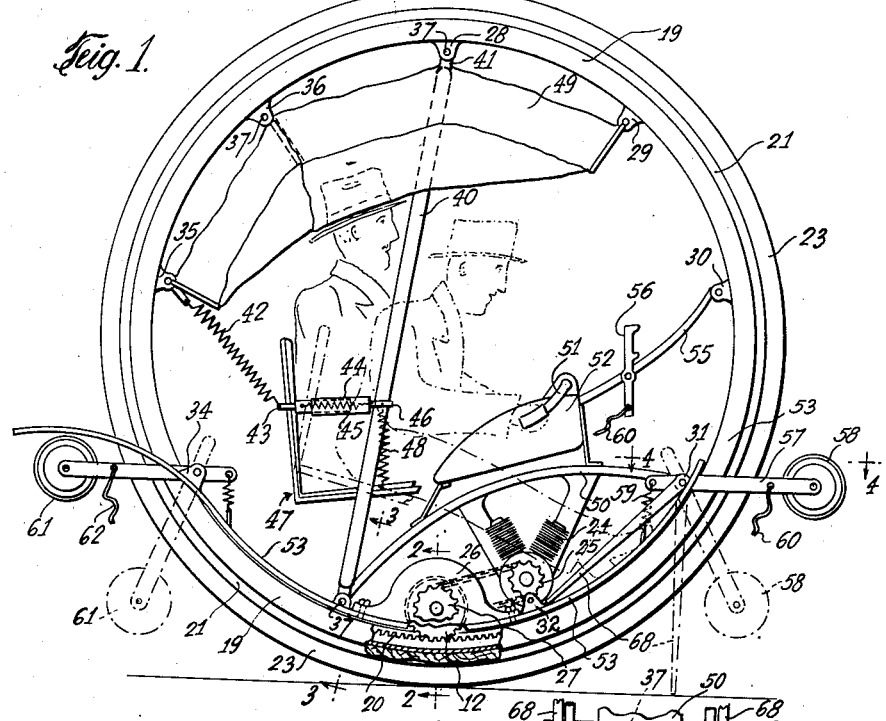
INVENTOR.
Julius Rose Patented Feb. 8, 1938

2,107,766

UNITED STATES PATENT OFFICE 2,107,766

MONOCYCLE

Julius Rose, Brooklyn, N. Y.

Application April 6, 1937, Serial No. 135,209

4 Claims. (Cl. 180—10)

One object of this invention is the provision of a motor propelled monocycle provided with means for keeping the same under complete control in the same manner as any ordinary automotive vehicle; the entire device being simple and compact in construction and operation.

The above and other objects and features of the invention are set forth in detail in the description below.

Referring briefly to the accompanying drawing, Figure 1 is a side elevational view of the device.

Figure 2 is a cross-sectional view taken on the line 2—2 of Figure 1.

Figure 3 is a cross-sectional view taken on the line 3—3 of Figure 1.

Figure 4 is a cross-sectional view taken on the line 4—4 of Figure 1.

Figure 5 is a plan view of a section of one of the ball retaining rings.

Figure 6 is a cross-sectional view taken on the line 6—6 of Figure 5.

Referring in detail to the drawing, the numeral 10 represents the inner ring of the monocycle, which may be approximately termed the equivalent of the chassis of an automotive vehicle. The ring 10 is split at its lowermost point to provide a slot 11 intermediate its width for the projection therethrough of a ring gear 12. At a distance radially outward from the ring 10, an outer ring 13 of slightly lesser width, is mounted. The ring 13 is separated from the ring 10 by means of ball bearings 14, whereon the ring 13 is rotatable about the ring 10. The balls 14 are carried at spaced-apart points in a ball retainer ring 15, one ring being mounted on either side of the center line (Figure 2) of the space between the rings 10 and 13. The ball retainer rings 15 are provided with spaced-apart holes 16 of slightly lesser diameter than that of the balls 14, and the balls 14 rest in these holes or sockets. A member 17 is secured to the ring 15 around each hole 16, this member having upwardly and inwardly extending ears 18 which engage the ball 14 at the upper portion thereof (Figure 6). Thus the balls 14 are free to rotate in their sockets and are securely retained in the ring 15. On either side of the rings 10 and 13, an arched annular rim 19 is mounted to exclude dust from the ball bearing compartment, and at the same time to secure the outer extremities of the ball retainer rings 15 in place. The inner extremities of the rings 15 loosely contact against the sides of a ring gear 20 which is fixed to the inner surface of the outer ring 13.

A wheel felloe 21 is secured on the outer rim 13 by means of screws 22 which pass through the ring 13 and into the ring gear 20, thus rigidly uniting these three members. A rubber or pneumatic tire 23 is mounted on the felloe 21.

An internal combustion motor, such as a motorcycle engine 24, is mounted within the ring 10, as will be described below. The gear 25 of the engine 24 drives the gear 27 which is rigid on the shaft of the gear 12. The latter is contained in a housing 26 bolted to the ring 10 at either end, as shown in Figure 1. The gear 12 is in mesh with the internal gear 20 and drives the same.

At arcuately spaced-apart positions on the rims 19, pairs of ears 28, 29, 30, 31, 32, 33, 34, 35, and 36 are mounted, one of each pair being transversely opposite the other. Bolts 37 join the two ears of each of the above-mentioned pairs of ears and lock the same together, these bolts thereby securing the rims 19 in place. A link 38 is pivotally mounted on one end to the bolt 37 of the ears 33, and at the other end on the transverse arm 39 of a square-shaped frame 40, the upper arm directly opposite the lower arm 39 of which is pivotally mounted in similar link 41 whose other end is similarly pivotally mounted on the bolt 37 of the ears 28. Coiled springs 42 have one end secured in each ear 35 and the other end secured to the extensions 43 of telescopic chair arms 44 which also contain coiled springs 45. The other ends 46 of the arms 44 are pivotally secured to the side arms of the frame 40. A combined chair seat and back 47 has its back secured to the extensions 43 of the arms 44 and its seat joined to the extensions 46 of these arms by means of springs 48. It is thus apparent that the chair 47 is given a pivotal spring suspension within the device to permit resilient movement, as shown in broken and in full lines in Figure 1. This construction facilitates transferring of the weight of the driver from a rearward to a forward position, as may be desirable in starting or stopping the device or in facilitating its movement up or downhill. A canopy 49 is suspended above the driver from the ears 29 and 35 and those intermediate these ears.

An arched bracket 50 is pivotally secured on the bolt 37 between the ears 31 and 33, and the handle bars 51, together with the gasoline tank 52 and the upper portion of the engine 24, are secured to the bracket 50. The lower point of the engine 24 is secured to the ears 32. A combined foot rest and mudguard 53 is secured on the lower portion of the ring 10 and is slotted at 54 toward the rear so that it may curve outward and rearward of the wheel. The bolts which secure the housing 26 to the rim 10 also fasten the mudguard 53 thereto, and additional bolts, not shown, may be provided for this purpose. A pair of additional frame members 55 are mounted between the ears 30 and the engine frame, between which a cradle 56 is pivotally mounted.

Adjacent each ear 31, a yoke bar 57 is pivotally mounted on the bolt 37, in the converging extremities of which a small auxiliary wheel 58 is rotatably mounted. Springs 59, secured to the inner extremities of the bars 57 and to the inner ring 10, normally urge the wheel 58 upward from the ground. A cable 60 is secured at one end to one yoke member 57 and at the other end to the cradle 56, by means of which the wheel 58 may be brought downward toward the ground upon rotation of the cradle 56, the intermediate length and path of the cable 60 being not shown. A wheel 61, constructed and mounted similarly to the wheel 58, is provided in the same position at the rear of the device. A cable 62 is similarly connected to the cradle 56 through a path not shown, so that it may be similarly operated.

Between the tire 23 and the wheel 58, a braking device is provided on the yokes 57 of each wheel 58 and 61. This device consists of a cylindrical shoe 63 rotatably mounted intermediate the length of a rod 64 which has one end pivoted in an ear 65 rigid with one yoke member 57. The rod 64 is widened at 65, and a hole extends therethrough for the passage therethrough of the other yoke member 57. The outer extremity 66 of the rod 64, has a cable 67 attached thereto, the other end of which is secured in the usual manner to one of the handle bars 51, or to any other convenient place where it may be readily operated by the driver. Tautening of the cable 67 will urge the shoe 63 against the tire 23 to brake the device. The detailed construction of the brake, as described, is one example only, although it may be constructed in any desirable and suitable manner. Also pivotally mounted in the ears 31, are a pair of standards 68 which normally rest in notches in the mudguard 53, and which may be swung downward therefrom to the position shown in broken lines in Figure 1, so that the device may be supported in upright position when at rest. A coiled spring 69 mounted between a cotter pin 70 and the rod 64, normally keeps the shoe 63 away from the tire 23.

The operation of the device is obvious. The gear 27, when driven by the engine 24, rotates the internal gear 20, thus propelling the device. Balance of the device is maintained by the driver who is free to shift his weight as may be necessary. The wheels 58 and 61 serve to prevent turning of the chassis too far from its normally upright position in case of sudden slowing down or speeding up of the device. Control of the position of the wheels 58 and 61 regulates the amount of tilting of the chassis either forward or rearward.

Obviously, modifications in form and structure may be made without departing from the spirit and scope of the invention.

I claim:
1. A device of the class described comprising an upright inner ring and an outer ring concentric with and spaced apart therefrom, an internal gear rigid with said outer ring intermediate the width of the latter, a tire mounted on said outer ring, a gear housing mounted on said inner ring and having a gear in mesh with said internal gear, ballbearings mounted between said rings on each side of said internal gear, retainer rings rotatably supporting said ballbearings, means for rotating said second-named gear, and annular rims loosely locking said inner and outer rings together.

2. A device of the class described comprising an upright inner ring and an outer ring concentric with and spaced apart therefrom, an internal gear rigid with said outer ring intermediate the width of the latter, a tire mounted on said outer ring, a gear housing mounted on said inner ring and having a gear in mesh with said internal gear, ballbearings mounted between said rings on each side of said internal gear, retainer rings rotatably supporting said ballbearings, means for rotating said second-named gear, a chair resiliently and pivotally suspended in said inner ring, and annular rims loosely locking said inner and outer rings together.

3. A device of the class described comprising an upright inner ring and an outer ring concentric with and spaced apart therefrom, an internal gear rigid with said outer ring intermediate the width of the latter, a tire mounted on said outer ring, a gear housing mounted on said inner ring and having a gear in mesh with said internal gear, ballbearings mounted between said rings on each side of said internal gear, retainer rings rotatably supporting said ballbearings, means for rotating said second-named gear, a chair resiliently and pivotally suspended in said inner ring, yokes pivotally mounted on the lower half of said inner ring at the forward and rearward sides thereof, auxiliary wheels supported in said yokes, means for swinging said auxiliary wheels downward toward the ground, resilient means normally urging said auxiliary wheels upward, and annular rims loosely locking said inner and outer rings together.

4. A device of the class described comprising an upright inner ring and an outer ring concentric with and spaced apart therefrom, an internal gear rigid with said outer ring intermediate the width of the latter, a tire mounted on said outer ring, a gear housing mounted on said inner ring and having a gear in mesh with said internal gear, ballbearings mounted between said rings on each side of said internal gear, retainer rings rotatably supporting said ballbearings, means for rotating said second-named gear, a chair resiliently and pivotally suspended in said inner ring, yokes pivotally mounted on the lower half of said inner ring at the forward and rearward sides thereof, auxiliary wheels supported in said yokes, means for swinging said auxiliary wheels downward toward the ground, resilient means normally urging said auxiliary upward, braking means for said tire mounted in said auxiliary wheel yokes, and annular rims loosely locking said inner and outer rings together.

JULIUS ROSE.